United States Patent [19]
Olesen

[11] 3,968,929
[45] July 13, 1976

[54] CENTRIFUGE

[75] Inventor: Henry Frederik Olesen, Lyngby, Denmark

[73] Assignee: Titan Separator A/S, Soborg, Denmark

[22] Filed: Apr. 15, 1975

[21] Appl. No.: 568,352

[30] Foreign Application Priority Data
Apr. 22, 1974 Germany............................ 2419355

[52] U.S. Cl..................................... 233/21; 233/27
[51] Int. Cl.²......................................... B04B 11/00
[58] Field of Search................. 233/7, 3, 21, 27, 28, 233/46, 1 R

[56] References Cited
UNITED STATES PATENTS

| | | | |
|---|---|---|---|
| 3,081,027 | 3/1963 | Coulson | 233/21 X |
| 3,423,015 | 1/1969 | O'Conor | 233/7 |
| 3,559,879 | 2/1971 | Bechard | 233/3 X |
| 3,623,656 | 11/1971 | Lavanchy | 233/7 |
| 3,784,091 | 1/1974 | Hiller | 233/27 |

Primary Examiner—George H. Krizmanich
Attorney, Agent, or Firm—Beveridge, DeGrandi, Kline & Lunsford

[57] ABSTRACT

A centrifuge for separating one or more liquid phases from a raw material, in which the liquid level in the centrifuge — and in case more liquid phases are withdrawn separately also an interface between different liquid phases — is determined by means of one or more inserts which are mounted in an outer wall of the centrifuge. The insert or inserts form part of a conduit or conduits through which the liquid phase or phases are withdrawn via a chamber in which a stationary skimmer disc is mounted. The inserts are accessible and replaceable from the outside of the centrifuge so that the liquid level or levels referred to may be varied by replacement or radial adjustment of the inserts after the centrifuge has been stopped, without dismantling any other parts of the centrifuge.

7 Claims, 2 Drawing Figures

CENTRIFUGE

BACKGROUND OF THE INVENTION

This invention relates to a centrifuge of the kind in which a liquid phase is withdrawn by means of a stationary skimmer disc, particularly but not exclusively a decanter having a separating space defined between an outer drum and an inner rotor which rotate at different angular velocities, the rotor carrying a screw conveyor which is operative in the separating space for discharging a solid phase therefrom.

When the liquid phase is withdrawn via a skimmer disc instead of being allowed to flow directly to the space surrounding the centrifuge drum it is, inter alia, possible to maintain a positive pressure in the discharge conduit which exceeds the pressure in the drum, and the formation of foam in the liquid discharged can be avoided or at any rate strongly limited. In the decanters mentioned above in which a solid phase is separated from a liquid phase present in the raw material and transported in the axial direction through the separating space by means of the screw until it is pushed out through an aperture at the end of the drum remote from the liquid outlet, it is furthermore possible to adjust the liquid level in the separating space by adjusting the positive pressure in the discharge conduit. The possibilities of adjustment are, however, rather limited and rather unreliable, inter alia because changes in the specific gravity of the liquid phase influence the location of the liquid level. Consequently, it has so far been the general practice to determine the liquid level by means of an annular disc which is secured to the drum and forms a weir at the liquid discharge end of the separating space. This purely geometric definition of the liquid level permits a very precise adjustment of the radial "height" of the liquid surface. It is, however, difficult to replace such a disc, particularly in the decanters mentioned above, in which at least the outer drum must necessarily be supported at both ends so that it is necessary to dismantle the main bearing of the drum together with a large number of additional components in order to gain access to the disc for replacing it with a disc of different central aperture.

SUMMARY OF THE INVENTION

According to the invention there is provided a centrifuge comprising means defining a separating space, means for introducing a raw material into said separating space, a discharge chamber separate from said separating space and communicating therewith through at least one liquid flow conduit, the portion of which immediately adjacent said separating space is formed by an insert which is mounted in an aperture in an outer wall of the centrifuge and accessible for replacement from the outside of said centrifuge wall, and a skimmer disc mounted in said discharge chamber for withdrawing liquid therefrom.

An important advantage of the invention is that the liquid level in the separating space is defined by the radial location of the innermost end of the insert or inserts and consequently it may readily be varied by displacing the insert radially relative to the drum axis or preferably by replacing the insert by another insert having a different length. Such adjustment or replacement requires no dismantling of additional components of the centrifuge, but can be performed as soon as the drum has been stopped, and it is therefore far less time-consuming and troublesome than the known adjustment performed by replacing a built-in weir disc. Thus, the invention creates the practical possibility that any separating process can always be accomplished with the optimum liquid level in the separating space, and this may be of great importance for the economy of the process and for the purity of the phases separated from each other. Within certain industries, e.g. in the production of fish-oil, variations in the composition and properties of the raw material processed often occur so frequently that essential improvements in quality are likely to be obtainable by small adjustments of the liquid level. It is, however, a requirement that such adjustments can be performed without any prolonged stoppage of the centrifuge, and this has been made possible by the invention. The easy adjustment of the height of the surface of the liquid is also of importance for carrying out separating processes where it is not known in advance which liquid level will yield the best result of the process and where it may consequently be advantageous that a suitable number of initial trial runs with different liquid levels may be performed in quick succession.

It is pointed out that it is known per se to discharge a liquid phase from a centrifuge via a replaceable insert which thus indirectly contributes to determine the location of an interface between two liquid phases in the centrifuge. In this case it is, however, a question of separating two liquid phases and the location of the interface depends also on other factors so that it is not uniquely determined by the radial dimension of the insert. In addition, the liquid phase in question flows directly out through the insert in the prior art centrifuges referred to, and not through a skimmer disc as according to the invention.

The insert or inserts may extend in the radial direction and be mounted beside the end face of the separating space. It may have an inwardly open blind hole which via at least one transverse bore communicates with the discharge chamber located outside the separating space. In this embodiment a direct and accurate determination of the radial height of the surface of the liquid as measured from the axis of the drum is obtained dependent on the length of the insert used.

The invention may also be applied in centrifuges designed for separating a raw material into a solid phase and two liquid phases having different specific gravities. In this case, each insert may extend into a pocket, which is open towards the separating space and provided in one end wall of said space, while at least one other pocket in the wall, spaced and separated from said first pocket, communicates with an outlet via a second insert mounted in the wall. Moreover, there is provided a partition wall spaced from the end face of the separating space and having apertures through which the separating space communicates with said first pocket or pockets, and the periphery of said partition wall extends radially outwards beyond the desired level of the heavier liquid phase. In this way, the inventive idea is utilized for determining not only the uppermost, that is to say the radially innermost, liquid surface in the drum, but also the interface between the two liquid phases each of which is discharged from the separating space via a separate insert or set of inserts. In this embodiment, the partition wall, which is apertured only in the regions of the primary or first pockets, ensures that the lighter liquid phase may flow into and through said primary pockets, but not in to the secondary pockets, whereas the heavier liquid phase can flow into both pockets or sets of pockets through the gap between the partition wall and the peripheral wall of the drum.

When there is no need for a foam-free discharge of the heavier liquid phase, the lastmentioned or secondary insert or inserts may be tubular and open freely in the outer wall of the drum. It is, however, also possible to include a stationary skimmer disc in the flow path of this phase downstream of the inserts and thus have both phases discharged in a similar manner.

In order that the radial location of the inlet opening of the insert can be accurately determined, the outer end of each insert may be provided with a collar intended for abutting against a shoulder in the aperture in the drum wall in which the insert is mounted.

BRIEF DESCRIPTION OF THE DRAWINGS

The invention will now be explained in greater detail with reference to the accompanying diagrammatical drawings in which.

In both figures of the drawings, only the components of the centrifuge necessary for understanding the invention are shown.

DETAILED DESCRIPTION

Figure 1:
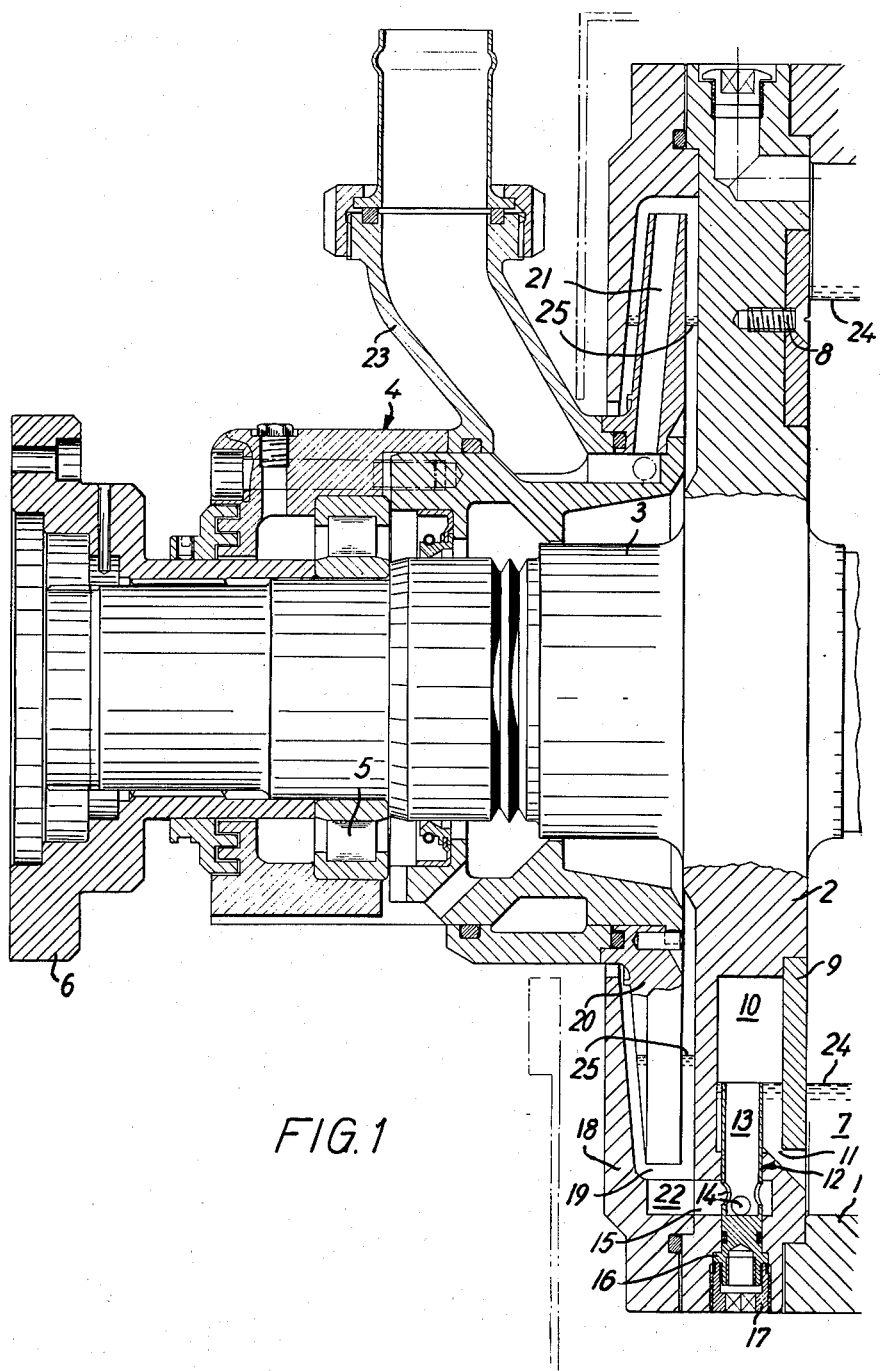
FIG. 1 is an axial section through that end of a decanter designed according to the invention, at which one liquid phase separated from a raw material is discharged.

To illustrate the general design and mode of operation of the centrifuge, reference may be had to FIG. 1 of pending German Patent Application No. P 23 49 298 — corresponding to U.S. patent application Ser. No. 508,942 assigned to the Assignee of the present invention — which figure shows a centrifuge having an outer drum and an internal rotor carrying a conveyor screw, as well as bearing means for the drum and the rotor. During operating of the centrifuge, a raw material, which contains a liquid phase and a solid phase, is supplied to the separating space defined between the drum and the rotor, and when the latter rotates at an angular velocity different from that of the drum, the screw conveyor will displace the solid material which due to the centrifugal force is pressed against the wall of the drum, towards an outlet aperture at one end of the drum, while the liquid phase is discharged through one or more apertures at the opposite end of the drum. The liquid level defined by the internal edge of the aperture or apertures is located "lower", that is to say radially farther from the drum axis, than the outlet aperture for the solid phase which consequently during the last part of its movement towards the associated outlet is moved out of the liquid and hence dried, at least partly.

The accompanying drawings show, in a purely diagrammatical way, the outlet end of the centrifuge for the liquid phase, both figures of the drawings showing an end portion of the outer drum 1 which is secured to a flange 2 or 26 on a through shaft 3. Shaft 3 extends through a stationary part or bearing bracket 4 of the centrifuge which supports the shaft by means of an anti-friction bearing 5. Suitable sealing means is provided between shaft 3 and bracket 4. A driving flange 6 for coupling the shaft 3 and hence the durm 1,2 to a driving mechanism (not shown) is secured to the outwardly projecting end of shaft 3.

The inner rotor (not shown) of the centrifuge which in a suitable way is journalled co-axially with drum 1,2 and coupled to the driving mechanism mentioned above, defines together with the outer drum an annular separating space 7 in which a screw conveyor (not shown) secured to the rotor moves the solid matter separated from the raw material in the direction towards an outlet (not shown) at the opposite end of the outer drum, when the rotor and the drum rotate at slightly different angular velocities, as mentioned above.

Referring in particular to FIG. 1, the side face of flange 2 facing the separating space 7 is formed with an annular recess in which an annular disc 9 is secured by means of screws 8, and behind the recess a plurality of chambers or pockets 10 are distributed evenly along the circumference of flange 2. As appears from the lower half of FIG. 1, each pocket 10 is in open communication with the separating space 7 through a gap 11 along the edge of the disc 9.

In the flange 2 a plurality of radial holes have been drilled from the outwardly facing edge surface of the flange and each hole opens into one of the pockets 10. In each of these holes an insert 12 is mounted with a tight fit, and each insert has a blind hole 13 drilled from the inner end of the insert and a plurality of transverse bores 14 connecting the hole 13 with a blind hole 15 drilled from the outwardly facing lateral surface of flange 2. At its outer end the insert 12 is provided with a collar 16 which locates the insert radially and which is held against a mating shoulder in the radial hole of flange 2 by means of a locking screw 17.

The drum is closed outwardy by an end cover 18 which by means of screws (not shown) is clamped to the flange 2 and to the drum 1. Between the flange and the end cover there is defined a discharge chamber 19 in which a stationary skimmer disc 20 is mounted. Skimmer disc 20 is secured to the bearing bracket 4 and provided with a plurality of drilled liquid discharge ducts 21. Blind holes or milled recesses 22 in the cover 18 connect chamber 19 with each of the blind holes 15 in the flange 2. All the discharge ducts 21 in the skimmer disc are connected to a stationary discharge spout 23.

During operation of the centrifuge, the surface of the liquid in the separating space 1 and in the pockets 10 connected thereto will adjust itself to a liquid level 24 corresponding to the radial location of the innermost end of the inserts 12. If a positive pressure is maintained in a conduit (not shown) connected to the branch 23 for discharging the liquid phase, the liquid level 25 in the chamber 19, which through bores 13, 14, 15 and 22 communicates with the pockets 10, may be higher than the level 24, as shown.

As already mentioned above, the liquid level 24 in the separating space and hence the radial distance between the surface of the liquid and the outlet (not shown), through which the partially dried solid phase is discharged from said space, can be varied by replacing the inserts 12 by other inserts, the innermost ends of which extend for a shorter or longer distance into the pockets 10. Such a replacement can be performed without dismantling any other parts of the centrifuge and requires only that the rotation of the drum and the rotor is stopped. Alternatively, the liquid level may be changed by interposing washers of corresponding thickness between the collar of each insert and the opposed shoulders in the holes accommodating the inserts.

Figure 2:
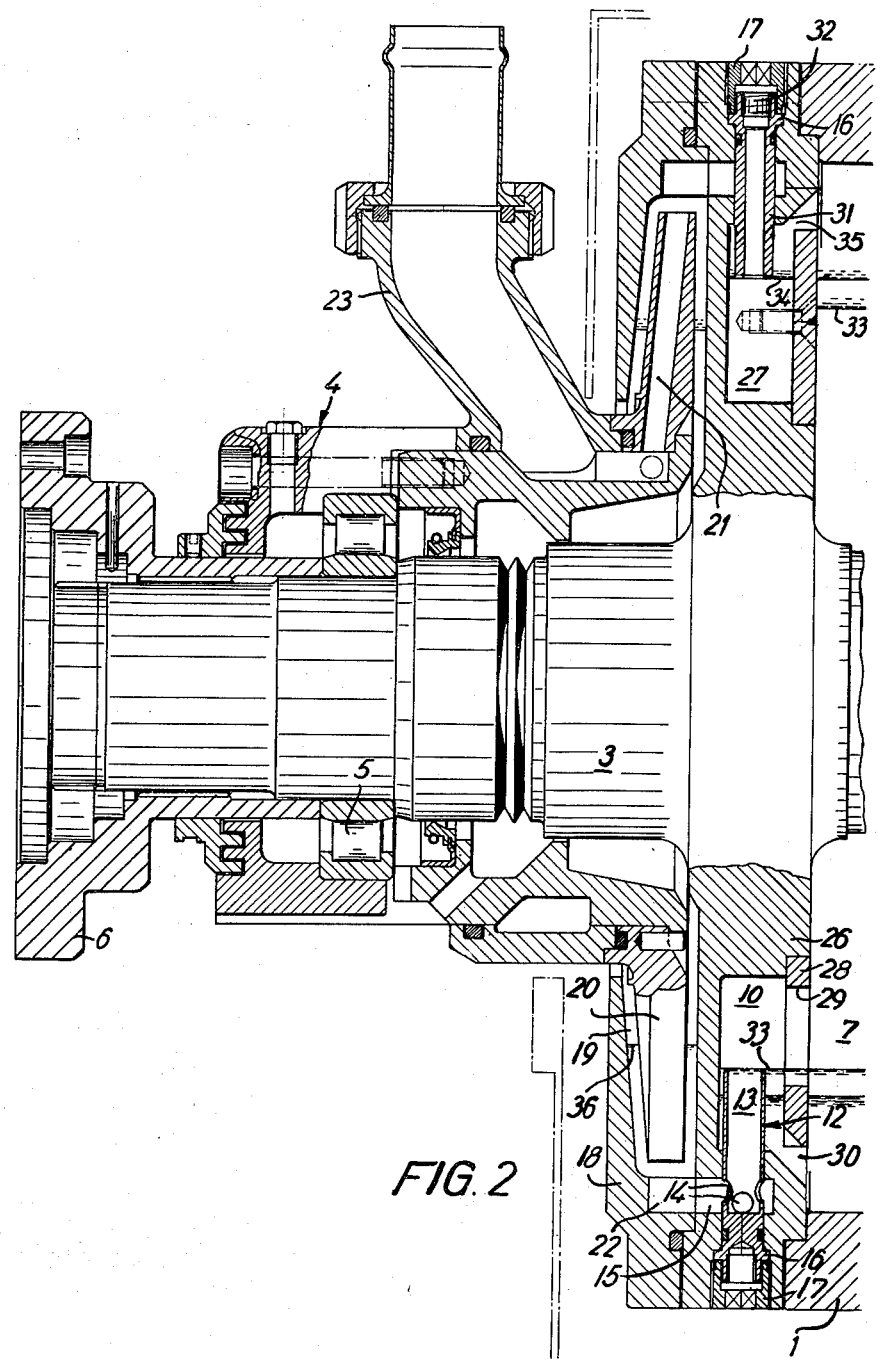
FIG. 2 is a corresponding section through another embodiment in which two liquid phases having different specific gravities are discharged separately.

The embodiment shown in FIG. 2 is substantially identical with that shown in FIG. 1, and correspondng components have been designated by the same reference numerals. The difference between them is that in addition to the angularly spaced pockets 10 the flange, have designated by 26, on shaft 3 has an additional set of pockets 27 each of which is located between a pair of pockets 10. The disc 9 secured in the recess of flange 2 has been replaced by an annular disc 28 provided with openings or apertures 29 aligned with the pockets 10, while the disc is imperforate in front of the pockets 27.

As in the embodiment of FIG. 1, the pockets 10 communicate with the discharge chamber 19, in which the skimmer disc 20 is mounted, through bores 13 and 14 in the replaceable inserts 12 and through ducts or milled recesses 15 and 22 in the flange 26 and the end cover 18, respectively. Liquid may flow from the separating space 7 to each pocket 10 not only through the associated aperture 29, but also through a gap 30 along the periphery of disc 28.

In addition to the radial bores, mentioned above in connection with FIG. 1, in the flange of the shaft 3, in which bores the inserts 12 are mounted, the flange 26 has a plurality of radial bores which open into the pockets 27 and in which inserts 31 are mounted. The inserts 31 are tubular with a through bore 32, and each insert is located radially by means of a collar 16 which is held in abutment against a shoulder in the bore of the flange by means of a locking screw 17 provided with a through central opening.

As shown in FIG. 2, the innermost end of each insert 12 is located closer to the axis or centre line of the drum than the ends of inserts 31, and thus the innermost ends of each set of inserts define a different liquid level 33 and 34, respectively, in the separating space 7, and in the respective pockets 10 and 27. Since the pockets 27 communicate with the separating space only through gaps 35 along the periphery of disc 28, while the pockets 10 communicate with the separating space both through the gaps 30 and through the apertures 29, two different liquid phases, viz. a lighter phase located between the two levels 33 and 34 and a heavier phase will be discharged through the respective inserts. When, as mentioned above, a positive pressure is maintained in the discharge spout 23 and the discharge ducts 21, the liquid level 35 of the lighter phase in the chamber 19, which phase is discharged via the skimmer disc 20, may be higher than the corresponding level 33 in the separating space.

It will be apparent that the embodiment in FIG. 2 not only permits a variation of the liquid level 33 in the separating drum by a replacement of the inserts 12, but also an independent adjustment of the liquid level 34 by a replacement of the inserts 31 and hence a variation in the ratio between the rates at which the liquid phases are discharged separately through each set of inserts. It will also be obvious that, if desirable or necessary, it will be possible to design the inserts 31 similar to the inserts 12 and to provide a further discharge chamber having a stationary skimmer disc corresponding to the chamber 19 and the skimmer disc 20, for withdrawing the heavier liquid phase.

What I claim is:

1. A centrifuge comprising means defining a separating space having an end wall and a peripheral wall, means for introducing a raw material into said separating space, a discharge chamber separate from said separating space, at least one liquid flow conduit connecting said separating space with said discharge chamber and having a liquid inlet end opening into said separating space, said liquid inlet end being formed by an insert mounted in an outer wall of the centrifuge and accessible for replacement from the outside of said outer wall, and a skimmer disc mounted in said discharge chamber for withdrawing liquid therefrom.

2. A centrifuge as claimed in claim 1, wherein said discharge chamber is located beyond an end face of said separating space, and said insert extends radially relative to the axis of said separating space and is formed with a blind hole open towards said axis and at least one transverse bore connecting said blind hole with said discharge chamber.

3. A centrifuge as claimed in claim 1 especially adapted for separating two liquid phases having different specific gravities, and further comprising a partition wall in said separating space adjacent said end wall thereof, the periphery of said partition wall being located radially between a desired level of the interface between said two liquid phases and said peripheral wall of the separating space, means defining at least one first pocket and one second pocket between said end wall and said partition wall said pockets being spaced from one another, an aperture in said partition wall connecting said separating space with said first pocket only, and apertures along the periphery of said partition wall connecting said separating space with either of said first and second pockets, a first liquid flow conduit connecting said separating space with said discharge chamber and having a liquid inlet end formed by a first insert opening into said first pocket, which insert is mounted in an outer wall of the centrifuge and accessible for replacement from the outside of said outer wall, and a second liquid flow conduit having a liquid inlet end formed by a second insert opening into said second pocket, which insert is mounted in an outer wall of the centrifuge and accessible for replacement from the outside of said outer wall.

4. A centrifuge as claimed in claim 3, wherein said second insert is tubular and opens at its outer end in the space surrounding the centrifuge.

5. A centrifuge as claimed in claim 1, wherein said insert is formed with a collar at its outer end, and an aperture is provided in said outer centrifuge wall for receiving said insert and having a shoulder for abutting engagement with said collar.

6. The centrifuge as defined in claim 1 further comprising a radially extending partition wall in said separating space adjacent said end wall, and means defining at least one pocket between said end wall and said partition wall, said liquid flow conduit including means providing fluid communication between said separating space and said at least one pocket.

7. The centrifuge as defined in claim 5 comprising at least two of said pockets between said partition wall and said end wall, said pockets being circumferentially spaced from one another, and wherein said insert includes a radially extending tubular portion having an open inlet end projecting into one of said pockets.

* * * * *